United States Patent [19]
Iwata et al.

[11] Patent Number: 5,644,082
[45] Date of Patent: Jul. 1, 1997

[54] VEHICLE ROTATIONAL-ANGLE CALCULATING APPARATUS

[75] Inventors: Eiji Iwata; Hiroyuki Maeda, both of Yokohama, Japan

[73] Assignee: Matsushita Electric Industrial Co., Ltd., Osaka, Japan

[21] Appl. No.: 496,618

[22] Filed: Jun. 29, 1995

[30] Foreign Application Priority Data

Jun. 30, 1994 [JP] Japan ................................. 6-150267

[51] Int. Cl.$^6$ .................................................. G01P 7/00
[52] U.S. Cl. ............................... 73/504.03; 73/118.1
[58] Field of Search ........................... 73/503.3, 504.01, 73/504.02, 504.03, 504.18, 118.1

[56] References Cited

U.S. PATENT DOCUMENTS

| | | | |
|---|---|---|---|
| 4,032,758 | 6/1977 | Lewis | 235/150 |
| 4,490,674 | 12/1984 | Ito | 324/207.25 |
| 4,924,402 | 5/1990 | Ando et al. | 364/424 |
| 5,058,023 | 10/1991 | Kozikaro | 364/450 |

FOREIGN PATENT DOCUMENTS

| | | |
|---|---|---|
| 0496538 | 7/1992 | European Pat. Off. . |
| 0523860 | 1/1993 | European Pat. Off. . |
| 0567268 | 10/1993 | European Pat. Off. . |
| 4240513 | 8/1992 | Japan . |
| 4346023 | 12/1992 | Japan . |
| 5172575 | 7/1993 | Japan . |

*Primary Examiner*—Sandra L. O'Shea
*Assistant Examiner*—Max H. Noori
*Attorney, Agent, or Firm*—Pollock, Vande Sande & Priddy

[57] ABSTRACT

A first sensor outputs a signal representing an angular rate of a vehicle body. A second sensor outputs a signal representing a direction of the vehicle body. The output signal of the first sensor is integrated to generate a signal representing a tentative rotational angle of the vehicle body. First data pieces are generated which represent temporally spaced samples of the output signal of the second sensor respectively. Second data pieces are generated which represent temporally spaced samples of the tentative rotational angle signal respectively. Two first data pieces are selected from among the first data pieces. Calculation is given of a time interval between the occurrence moments of the selected two first data pieces. Two second data pieces are selected from among the second data pieces. Calculation is given of a direction difference between directions represented by the selected two first data pieces. Calculation is given of a rotational-angle difference between tentative rotational angles represented by the selected two second data pieces. An amount of offset in the output signal of the first sensor is calculated in response to the calculated time interval and the calculated rotational-angle difference in cases where the calculated direction difference is equal to or smaller than a predetermined direction difference. The output signal of the first sensor is corrected into an offset-free signal in response to the calculated offset amount. The offset-free signal is integrated to generate a signal representing a final rotational angle of the vehicle body.

8 Claims, 6 Drawing Sheets

VEHICLE ROTATIONAL-ANGLE CALCULATING APPARATUS

BACKGROUND OF THE INVENTION

1. Field of the Invention

This invention relates to an apparatus for calculating a rotational angle or a turn angle of a moving object such as an automotive vehicle.

2. Description of the Prior Art

Some car navigation systems (automotive navigation systems) include sensors for detecting angular rates or angular velocities of car bodies (vehicle bodies). Examples of such angular-velocity sensors are fiber-optic gyroscopes, mechanical gyroscopes, and vibratory gyroscopes. Generally, the output signal of an angular-velocity sensor has offset components in addition to detected information components. To accurately derive detected information from the output signal of the angular-velocity sensor, it is necessary to cancel the offset components in the angular-velocity sensor output signal.

In a car navigation system, the amount of offset in the output signal of an angular-velocity sensor tends to be drifted by various causes. A prior-art device for canceling the signal offset can not adequately follow certain types of drift of the signal offset.

SUMMARY OF THE INVENTION

It is an object of this invention to provide an improved apparatus for calculating a rotational angle (a turn angle) of a moving object such as an automotive vehicle.

A first aspect of this invention provides a vehicle rotational-angle calculating apparatus comprising a first sensor outputting a signal representing an angular rate of a vehicle body; a second sensor outputting a signal representing a direction of the vehicle body; first means connected to the first sensor for integrating the output signal of the first sensor to generate a signal representing a tentative rotational angle of the vehicle body; second means connected to the second sensor for generating first data pieces representing temporally spaced samples of the output signal of the second sensor respectively; third means connected to the first means for generating second data pieces representing temporally spaced samples of the signal generated by the first means respectively; fourth means connected to the second means for selecting two first data pieces from among the first data pieces generated by the second means, the selected two first data pieces relating to occurrence moments spaced by at least a given time; fifth means connected to the fourth means for calculating a time interval between the occurrence moments of the selected two first data pieces; sixth means connected to the third means for selecting two second data pieces from among the second data pieces generated by the third means, the selected two second data pieces relating to occurrence moments corresponding to the occurrence moments of the selected first data places respectively; seventh means connected to the fourth means for calculating a direction difference between directions represented by the selected two first data pieces; eighth means connected to the seventh means for deciding whether or not the direction difference calculated by the seventh means is greater than a predetermined direction difference; ninth means connected to the sixth means for calculating a rotational-angle difference between tentative rotational angles represented by the selected two second data pieces; tenth means connected to the fifth means, the eighth means, and the ninth means for calculating an amount of offset in the output signal of the first sensor in response to the time interval calculated by the fifth means and the rotational-angle difference calculated by the ninth means in cases where the eighth mesas decides that the direction difference calculated by the seventh means is equal to or smaller than the predetermined direction difference; eleventh means connected to the first sensor and the tenth means for correcting the output signal of the first sensor into an offset-free signal in response to the offset amount calculated by the tenth means; and twelfth means connected to the eleventh means for integrating the offset-free signal to generate a signal representing a final rotational angle of the vehicle body.

A second aspect of this invention provides a vehicle rotational-angle calculating apparatus comprising a first sensor outputting a signal representing an angular rate of a vehicle body; a second sensor outputting a signal representing a direction of the vehicle body; first means connected to the first sensor for integrating the output signal of the first sensor to generate a signal representing a tentative rotational angle of the vehicle body; second means connected to the second sensor for generating first data pieces representing temporally spaced samples of the output signal of the second sensor respectively; third means connected to the first means for generating second data pieces representing temporally spaced samples of the signal generated by the first means respectively; fourth means connected to the second means for selecting a first pair of first data pieces and a second pair of first data pieces from among the first data pieces generated by the second means; fifth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively; sixth means connected to the fourth means for calculating a first direction difference between directions represented by the two first data pieces in the first pair, and a second direction difference between directions represented by the two first data pieces in the second pair; seventh means connected to the fifth means for calculating a first rotational-angle difference between tentative rotational angles represented by the two second data pieces in the first pair, and a second rotational-angle difference between tentative rotational angles represented by the two second data pieces in the second pair; eighth means connected to the sixth means for calculating a difference between the first direction difference and the second direction difference calculated by the sixth means; ninth means connected to the seventh means for calculating a difference between the first rotational-angle difference and the second rotational-angle difference calculated by the seventh means; tenth means connected to the eighth means and the ninth means for calculating a sensitivity coefficient related to the output signal of the first sensor in response to the difference calculated by the eighth means and the difference calculated by the ninth means; eleventh means connected to the first sensor and the tenth means for correcting a magnitude of the output signal of the first sensor in response to the sensitivity coefficient calculated by the tenth means to convert the output signal of the first sensor into a gain-corrected signal; and twelfth means connected to the eleventh means for integrating the gain-corrected signal to generate a signal representing a final rotational angle of the vehicle body.

A third aspect of this invention provides a vehicle rotational-angle calculating apparatus comprising a first sensor outputting a signal representing an angular rate of a vehicle body; a second sensor outputting a signal representing a direction of the vehicle body; first means connected to the first sensor for integrating the output signal of the first sensor to generate a signal representing a tentative rotational angle of the vehicle body; second means connected to the second sensor for generating first data pieces representing temporally spaced samples of the output signal of the second sensor respectively; third means connected to the first means for generating second data pieces representing temporally spaced samples of the signal generated by the first means respectively; fourth means connected to the second means for selecting a first pair of first data pieces and a second pair of first data pieces from among the first data pieces generated by the second means; fifth means connected to the fourth means for calculating a first time interval between the occurrence moments of the two first data pieces in the first pair, and a second time interval between the occurrence moments of the two first data pieces in the second pair; sixth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively; seventh means connected to the fourth means for calculating a first direction difference between directions represented by the two first data pieces in the first pair, and a second direction difference between directions represented by the two first data pieces in the second pair; eighth means connected to the fifth means for calculating a sum of the first time interval and the second time interval calculated by the fifth means; ninth means connected to the seventh means for calculating a sum of the first direction difference and the second direction difference calculated by the seventh means; tenth means connected to the eighth means for deciding whether or not the sum calculated by the eighth means is smaller than a predetermined time interval; eleventh means connected to the ninth means for deciding whether or not the sum calculated by the ninth means is greater than a predetermined direction difference; twelfth means connected to the sixth means for calculating a first rotational-angle difference between tentative rotational angles represented by the two second data pieces in the first pair, and a second rotational-angle difference between tentative rotational angles represented by the two second data pieces in the second pair; thirteenth means connected to the twelfth means for calculating a sum of the first rotation-angle difference and the second rotational-angle difference calculated by the twelfth means; fourteenth means connected to the eighth means, the tenth means, the eleventh means, and the thirteenth means for calculating an amount of offset in the output signal of the first sensor in response to the sum calculated by the eighth means and the sum calculated by the thirteenth means in cases where the tenth means decides that the sum calculated by the eighth means is equal to or greater than the predetermined time interval and the eleventh means decides that the sum calculated by the ninth means is equal to or smaller than a predetermined direction difference; fifteenth means connected to the first sensor and the fourteenth means for correcting the output signal of the first sensor into an offset-free signal in response to the offset amount calculated by the fourteenth means; sixteenth means connected to the seventh means for calculating a difference between the first direction difference and the second direction difference calculated by the seventh means; seventeenth means connected to the twelfth means for calculating a difference between the first rotational-angle difference and the second rotational-angle difference calculated by the twelfth means; eighteenth means connected to the sixteenth means and the seventeenth means for calculating a sensitivity coefficient related to the output signal of the first sensor in response to the difference calculated by the sixteenth means and the difference calculated by the seventeenth means; nineteenth means connected to the first sensor and the eighteenth means for correcting a magnitude of the output signal of the first sensor in response to the sensitivity coefficient calculated by the eighteenth means to convert the output signal of the first sensor into a gain-corrected signal; and twentieth means connected to the nineteenth means for integrating the gain-corrected signal to generate a signal representing a final rotational angle of the vehicle body.

A fourth aspect of this invention provides a vehicle rotational-angle calculating apparatus comprising a first sensor outputting a signal representing an angular rate of a vehicle body; a second sensor outputting a signal representing a direction of the vehicle body; first means connected to the first sensor for integrating the output signal of the first sensor to generate a signal representing a tentative rotational angle of the vehicle body; second means connected to the second sensor for generating first data pieces representing temporally spaced samples of the output signal of the second sensor respectively; third means connected to the first means for generating second data pieces representing temporally spaced samples of the signal generated by the first means respectively; fourth means connected to the second means for selecting a first pair of first data pieces and a second pair of first data pieces from among the first data pieces generated by the second means; fifth means connected to the fourth means for calculating a first time interval between the occurrence moments of the two first data pieces in the first pair, and a second time interval between the occurrence moments of the two first data pieces in the second pair; sixth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively; seventh means connected to the fourth means for calculating a first direction difference between directions represented by the two first data pieces in the first pair, and a second direction difference between directions represented by the two first data pieces in the second pair; eighth means connected to the fifth means for calculating a sum of the first time interval and the second time interval calculated by the fifth means; ninth means connected to the seventh means for calculating a sum of the first direction difference and the second direction difference calculated by the seventh means; tenth means connected to the eighth means for deciding whether or not the sum calculated by the eighth means is smaller than a predetermined time interval; eleventh means connected to the ninth means for deciding whether or not the sum calculated by the ninth means is greater than a predetermined direction difference; twelfth means connected to the sixth means for calculating a first rotational-angle difference between tentative rotational angles represented by the two second data pieces in the first pair, and a second rotational-angle difference between tentative rotational angles represented by the two second data pieces in the second pair; thirteenth means connected to the twelfth means for calculating a sum of the first rotation-angle difference and the second rotational-angle difference calculated by the twelfth means; fourteenth means connected to the eighth means, the tenth means, the eleventh means, and the thirteenth means for calculating an amount of offset in the output signal of the first sensor in response to the sum calculated by the eighth means and the sum calculated by the thirteenth means in cases where the tenth means decides that the sum calculated by the eighth means is equal to or greater than the predetermined time interval and the eleventh means decides that the sum calculated by the ninth means is equal to or smaller than a predetermined direction difference; fifteenth means connected to the first sensor and the fourteenth means for correcting the output signal of the first sensor into an offset-free signal in response to the offset amount calculated by the fourteenth means; and sixteenth means connected to the fifteenth means for integrating the offset-free signal to generate a signal representing a final rotational angle of the vehicle body.

A fifth aspect of this invention is based on the first aspect thereof, and provides a vehicle rotational-angle calculating apparatus further comprising thirteenth means connected to the second means and the third means for storing each of the first data pieces and the second data pieces during a predetermined length of time.

A sixth aspect of this invention is based on the first aspect thereof, and provides a vehicle rotational-angle calculating apparatus further comprising thirteenth means connected to the second sensor for detecting an accuracy of the output signal of the second sensor, and fourteenth means connected to the tenth means and the thirteen means for controlling the offset amount calculated by the tenth means in response to the accuracy detected by the thirteenth means.

A seventh aspect of this invention is based on the first aspect thereof, and provides a vehicle rotational-angle calculating apparatus further comprising thirteenth means connected to the tenth means for deciding whether or not the offset amount calculated by the tenth means is in a predetermined range, and fourteenth means connected to the eleventh means and the thirteenth means for controlling the correction by the eleventh means in response to whether or not the offset amount calculated by the tenth means is in the predetermined rage.

An eighth aspect of this invention is based on the first aspect thereof, and provides a vehicle rotational-angle calculating apparatus further comprising thirteenth means connected to the second sensor and the first means for periodically calculating a direction difference between the vehicle body direction represented by the output signal of the second sensor and the tentative rotational angle represented by the signal generated by the first means, fourteenth means connected to the thirteenth means for averaging latest and previous direction differences calculated by the thirteenth means into a mean direction difference during every given interval, fifteenth means connected to the fourteenth means for separating latest and previous mean direction differences calculated by the fourteenth means into groups according to related vehicle body directions, and sixteenth means connected to the fifteenth means and contained in the tenth means for determining the offset amount in response to mean direction differences in same one of the groups.

DESCRIPTION OF THE PREFERRED EMBODIMENTS

Figure 1:
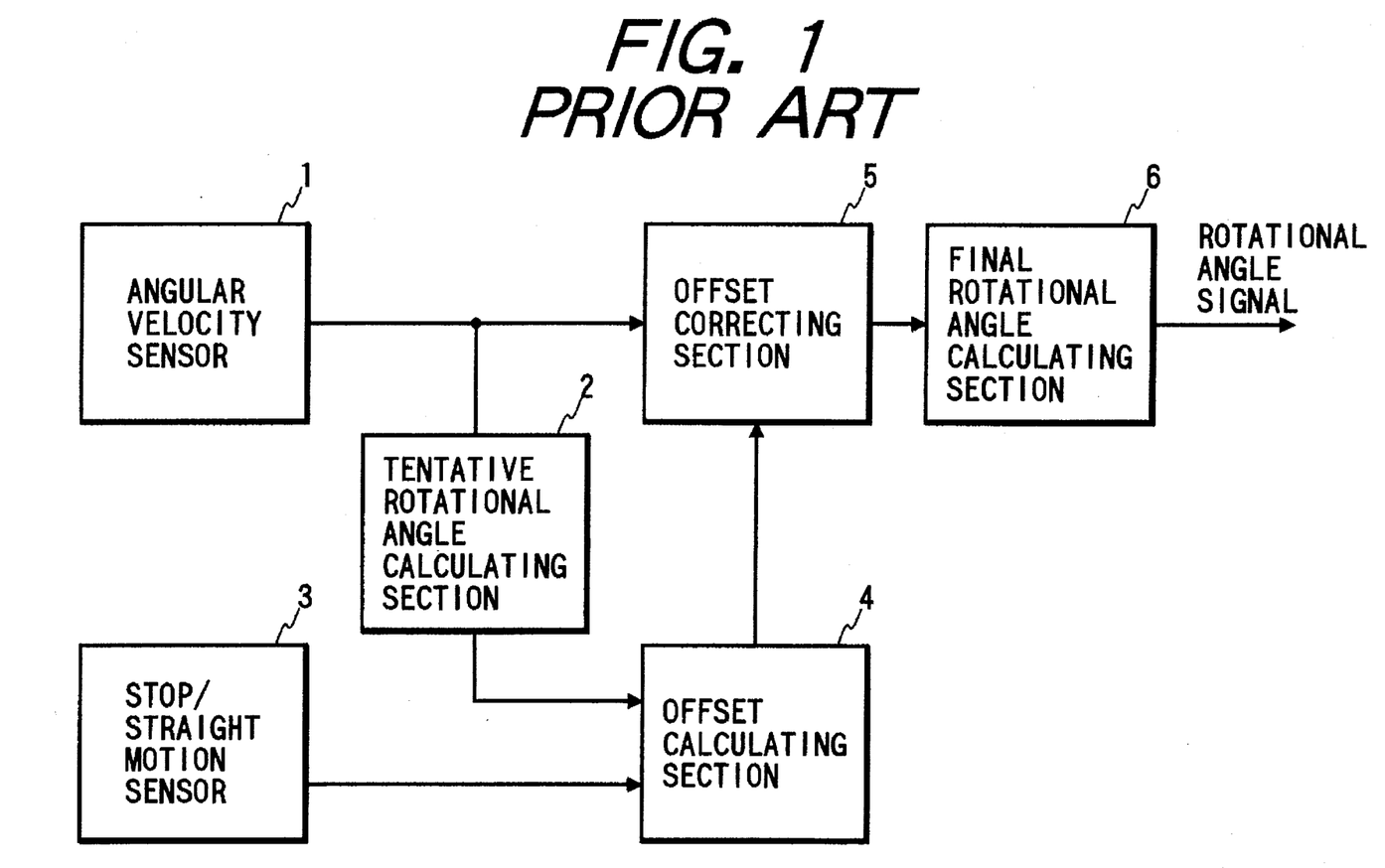
FIG. 1 is a flow diagram of the function of a prior-art apparatus for calculating a rotational angle of an automotive vehicle.

First, a prior-art apparatus for calculating a rotational angle (a turn angle) of an automotive vehicle will be described for a better understanding of this invention. FIG. 1 shows a prior-art rotational-angle calculating apparatus.

With reference to FIG. 1, the prior-art apparatus includes an angular-velocity sensor 1 mounted on a vehicle body (not shown). The angular-velocity sensor 1 outputs a signal representing the angular velocity or the angular rate of the vehicle body.

A tentative rotational-angle calculating section 2 following the angular-velocity sensor 1 calculates the tentative value of a rotational angle (a turn angle) of the vehicle body by integrating the output signal of the angular-velocity sensor 1.

A stop/straight motion detecting section 3 connected to the vehicle body detects whether or not the vehicle body is stationary, and also detects whether or not the vehicle body is traveling straight.

An offset calculating section 4 following the tentative rotational-angle calculating section 2 and the stop/straight motion detecting section 3 estimates or calculates an amount of offset in the output signal of the angular-velocity sensor 1 from output signals of the tentative rotational-angle calculating section 2 and the stop/straight motion detecting section 3. The offset calculating section 4 generates and outputs a signal representing the calculated amount of offset in the output signal of the angular-velocity sensor 1. The signal representing the offset amount is referred to as the offset-representing signal.

An offset correcting section 5 follows the angular-velocity sensor 1 and the offset calculating section 4, and receives the output signals thereof. The offset correcting section 5 subtracts the output signal of the offset calculating section 4 from the output signal of the angular-velocity sensor 1, thereby removing offset components from the output signal of the angular-velocity sensor 1 and correcting the output signal of the angular-velocity sensor 1 into an offset-free angular-velocity signal. The offset correcting section 5 outputs the offset-free angular-velocity signal.

A final rotational-angle calculating section 6 following the offset correcting section 5 calculates the final value of the rotational angle (the turn angle) of the vehicle body by integrating the offset-free angular-velocity signal outputted from the offset correcting section 5. The final rotational-angle calculating section 6 outputs a signal representing the calculated final value of the rotational angle (the turn angle) of the vehicle body.

The offset calculating section 4 is enabled and disabled in response to the output signal of the stop/straight motion detecting section 3. Specifically, the offset-calculating section 4 is enabled when the output signal of the stop/straight motion detecting section 3 represents that the vehicle body is stationary or traveling straight. Otherwise, the offset-calculating section 4 is disabled.

When the vehicle body is stationary or traveling straight, angular-velocity components (information-indicating components) of the output signal of the angular-velocity sensor 1 are nullified but offset components remain therein. During other conditions of the vehicle body, angular-velocity components (information-indicating components) as well as offset components are present in the output signal of the angular-velocity sensor 1.

When the vehicle body is stationary or traveling straight, the offset calculating section 4 is enabled and hence calculates the amount of offset in the output signal of the angular-velocity sensor 1 from the output signal of the tentative rotational-angle calculating section 2. During other conditions of the vehicle body, the offset calculating section 4 remains disabled.

The offset-representing signal is held by a memory within the offset calculating section 4. The offset-representing signal can be continuously fed from the offset calculating section 4 to the offset correcting section 5. In general, each time the vehicle body stops or travels straight, the offset calculating section 4 updates the offset-representing signal.

As long as the vehicle body turns or meanders, the offset-representing signal continues to be not updated. Therefore, in the case where the vehicle body remains turning or meandering for a long time, the updating of the offset-representing signal continues to be unexecuted. Since the offset components of the output signal of the angular-velocity sensor 1 tend to considerably drift in such a long time, the accuracy of the offset-representing signal significantly decreases as time goes by during the continuation of un-execution of the updating thereof. The decrease in the accuracy of the offset-representing signal results in a decrease in the accuracy of the output signal of the final rotational-angle calculating section 6 which represents the final value of the rotational angle of the vehicle body.

First Embodiment

Figure 2:
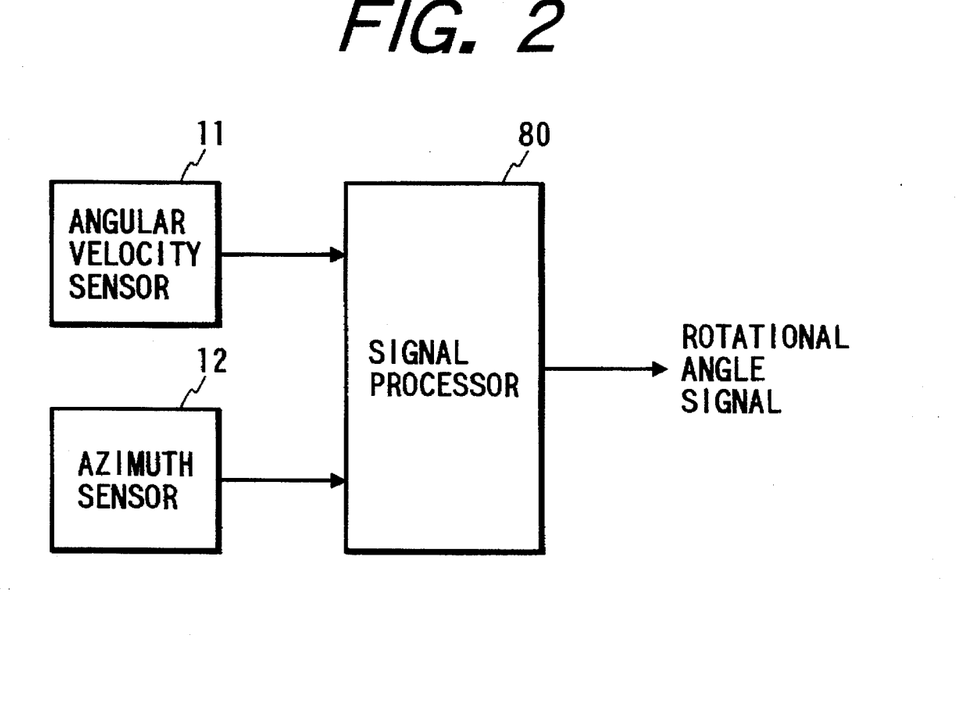
FIG. 2 is a block diagram of a vehicle rotational-angle calculating apparatus according to a first embodiment of this invention.

A first embodiment of this invention will be described hereinafter. FIG. 2 shows a vehicle rotational-angle calculating apparatus according to a first embodiment of this invention.

With reference to FIG. 2, the vehicle rotational-angle calculating apparatus includes an angular-velocity sensor 11 mounted on a vehicle body (not shown). The angular-velocity sensor 1 outputs a signal representing the angular velocity or the angular rate of the vehicle body. The angular-velocity sensor 11 uses one of various gyroscopes such as fiber-optic gyroscopes, mechanical gyroscopes, and vibratory gyroscopes.

An azimuth sensor (a direction sensor) 12 mounted on the vehicle body outputs a signal representing the azimuth (the pointing direction) of the vehicle body. Thus, the output signal of the azimuth sensor 12 represents the direction in which the vehicle body is pointed, or the direction in which the vehicle is advancing. The azimuth sensor 12 uses a GPS (global positioning system) direction sensor or a geomagnetic sensor.

A signal processor or a microcomputer 80 connected to the angular-velocity sensor 11 and the azimuth sensor 12 receives the output signals thereof. The signal processor 80 generates a signal representative of a rotational angle (a turn angle) of the vehicle body in response to the output signals of the angular-velocity sensor 11 and the azimuth sensor 12. The generated signal representing the rotational angle is referred to as the rotational-angle signal. The signal processor 80 outputs the rotational-angle signal.

The signal processor 80 includes a combination of an interface circuit (an input/output circuit), a CPU, a RAM, and a ROM. The interface circuit has analog-to-digital converters for converting the output signals of the angular-velocity sensor 11 and the azimuth sensor 12 into corresponding digital signals (data). Specifically, a first analog-to-digital converter periodically samples the output signal of the angular-velocity sensor 11, and changes every resultant sample into a corresponding digital data piece. In addition, a second analog-to-digital converter periodically samples the output signal of the azimuth sensor 12, and changes every resultant sample into a corresponding digital data piece. The timing of the sampling of the output signal of the angular-velocity sensor 11 substantially agrees with the timing of the sampling of the output signal of the azimuth sensor 12. The signal processor 80 operates in accordance with a program stored in the ROM.

Figure 3:
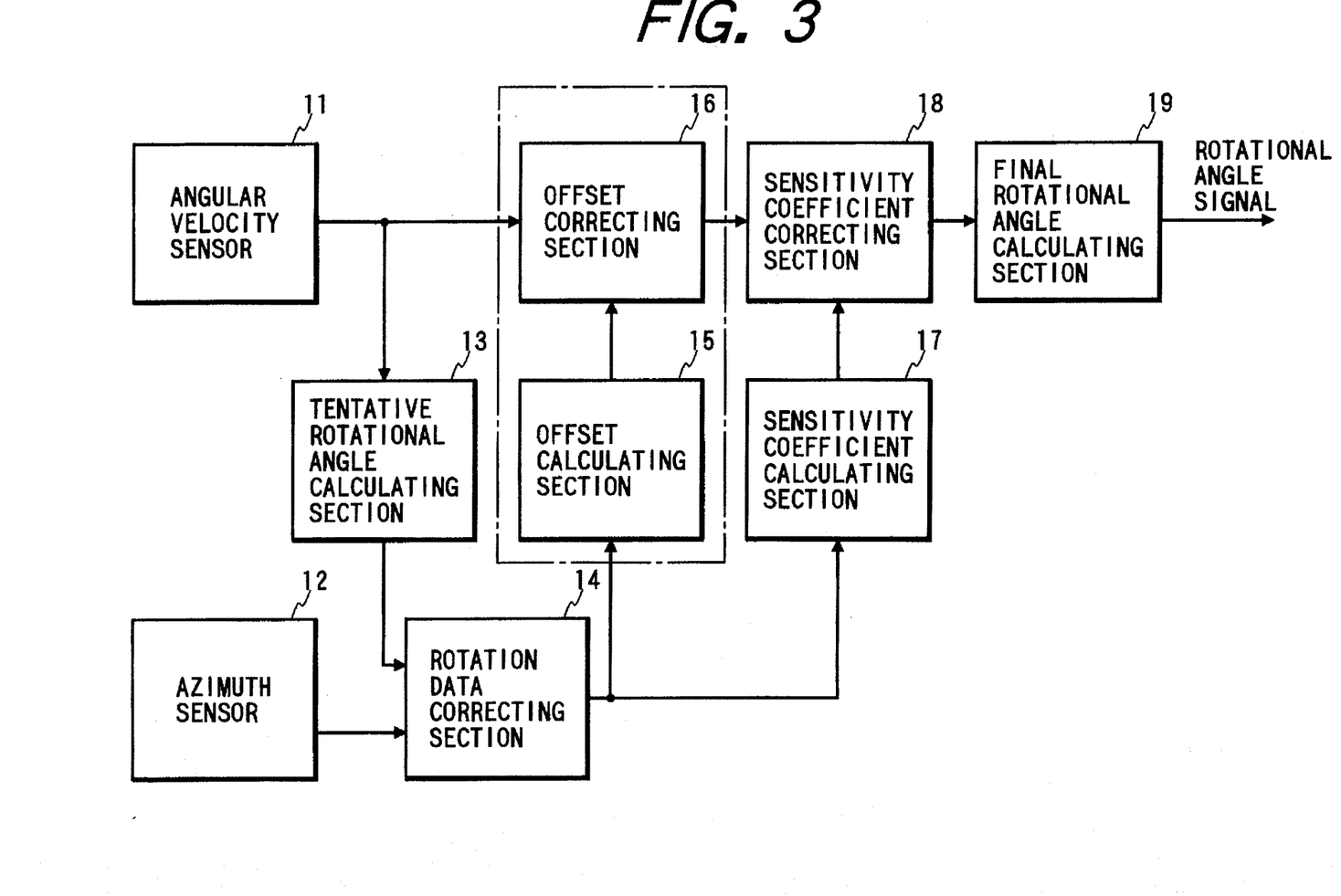
FIG. 3 is a flow diagram of the function of the vehicle rotational-angle calculating apparatus according to the first embodiment.

FIG. 3 is a flow diagram of the function of the signal processor 80 which is determined by the aforementioned program. It should be noted that FIG. 3 does not directly show the hardware of the signal processor 80. It is a common practice in the art to use such a function flow diagram in explaining the operation of a signal processor.

With reference to FIG. 3, a tentative rotational-angle calculating section 13 periodically calculates the tentative value of a rotational angle (a turn angle) of the vehicle body by integrating the output signal of the angular-velocity sensor 11. For example, the integration is executed by adding or accumulating digitized samples of the output signal of the angular-velocity sensor 11.

A rotation data collecting section 14 collects data pieces representing the latest and previous tentative rotational-angle values which are calculated by the tentative rotational-angle calculating section 13. Specifically, the collected data pieces representing the latest and previous tentative rotational-angle values are stored in the RAM within the signal processor 80. In addition, the rotation data collecting section 14 collects data pieces representing the latest and previous azimuths of the vehicle body which are represented by the output signal of the azimuth sensor 12. Occurrence moments with respect to the latest and previous azimuths substantially agree with occurrence moments related to the latest and previous tentative rotational-angle values respectively. The collected data pieces representing the latest and previous azimuths are stored in the RAM within the signal processor 80. The collected data pieces representing the latest and previous tentative rotational-angle values are referred to as the first-type rotation data pieces. The collected data pieces representing the latest and previous azimuths are referred to as the second-type rotation data pieces.

It is preferable that the number of the first-type rotation data pieces and the number of the second-type rotation data pieces held by the RAM within the signal processor 80 are limited to a given number. In this case, the oldest first-type and second-type rotation data pieces are erased from the RAM each time the new first-type and second-type rotation data pieces are written into the RAM. Thus, the time during which every first-type rotation data piece and every second-type rotation data piece remains stored in the RAM is limited to a given interval.

An offset calculating section 15 receives the first-type and second-type rotation data pieces which are collected by the rotation data collecting section 14. The offset calculating section 15 estimates or calculates an amount of offset in the output signal of the angular-velocity sensor 11 from the first-type and second-type rotation data pieces. The offset calculating section 15 generates a signal representing the calculated amount of offset in the output signal of the angular-velocity sensor 11. The generated signal representing the calculated amount of offset is referred to as the offset-representing signal.

An offset correcting section 16 receives a digitized version of the output signal of the angular-velocity sensor 11. The offset correcting section 16 is informed of the offset-representing signal generated by the offset calculating section 15. The offset correcting section 16 subtracts the offset-representing signal from the digitized version of the output signal of the angular-velocity sensor 11, thereby removing offset components from the digitized version of the output signal of the angular-velocity sensor 11 and correcting the digitized version of the output signal of the angular-velocity sensor 11 into an offset-free angular-velocity signal.

A sensitivity coefficient calculating section (A gain factor calculating section) 17 receives the first-type and second-type rotation data pieces which are collected by the rotation data collecting section 14. The sensitivity coefficient calculating section 17 estimates or calculates a sensitivity coefficient (a gain factor), related to the output signal of the angular-velocity sensor 11, from the first-type and second-type rotation data pieces. The sensitivity coefficient calculating section 17 generates a signal representing the calculated sensitivity coefficient related to the output signal of the angular-velocity sensor 11. The generated signal representing the calculated sensitivity coefficient is referred to as the sensitivity coefficient signal.

A sensitivity coefficient correcting section (A gain factor correcting section) 18 receives the offset-free angular-velocity signal which is generated by the offset correcting section 16. The sensitivity coefficient correcting section 18 also receives the sensitivity coefficient signal which is generated by the sensitivity coefficient calculating section 17. The sensitivity coefficient correcting section 18 corrects the offset-free angular-velocity signal into a gain-corrected angular-velocity signal in response to the sensitivity coefficient signal. Specifically, the gain-corrected angular-velocity signal results from dividing the offset-free angular-velocity signal by the sensitivity coefficient which is represented by the sensitivity coefficient signal.

A final rotational-angle calculating section 19 receives the gain-controlled angular-velocity signal which is generated by the sensitivity coefficient correcting section 18. The final rotational-angle calculating section 19 calculates the final value of the rotational angle (the turn angle) of the vehicle body by integrating the gain-corrected angular-velocity signal. The final rotational-angle calculating section 19 generates and outputs a signal representing the calculated final value of the rotational angle of the vehicle body. The output signal of the final rotational-angle calculating section 19 constitutes the rotational-angle signal.

Figure 4:
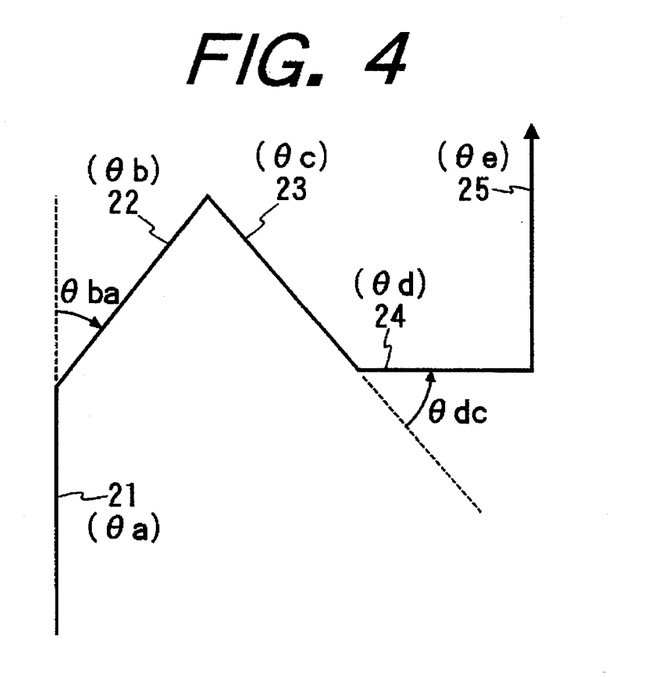
FIG. 4 is a diagram of an example of a time-domain change in the azimuth of a vehicle body.

The offset calculating section 15 will be further described. It is now assumed that, as shown in FIG. 4, the vehicle body sequentially assumes azimuths (pointing directions) 21, 22, 23, 24, and 25. The azimuths 21, 22, 23, 24, and 25 are also denoted by $\theta a$, $\theta b$, $\theta c$, $\theta d$, and $\theta e$ respectively. The offset calculating section 15 refers to the azimuths $\theta a$, $\theta b$, $\theta c$, $\theta d$, and $\theta e$ which are represented by the second-type rotation data pieces collected by the rotation data collecting section 14. The offset calculating section 15 also uses the first-type rotation data pieces collected by the rotation data collecting section 14. The first-type rotation data pieces represent the tentative rotational-angle values $\phi a$, $\phi b$, $\phi c$, $\phi d$, and $\phi e$ which correspond in occurrence moments to the azimuths $\theta a$, $\theta b$, $\theta c$, $\theta d$, and $\theta e$ respectively.

The offset calculating section 15 calculates the time Tea between the moment of the occurrence of the azimuth $\theta a$ and the moment of the occurrence of the azimuth $\theta e$. The offset calculating section 15 calculates the difference $\phi ea$ between the tentative rotational-angle value $\phi a$ and the tentative rotational-angle value $\phi e$ which relate to occurrence moments substantially equal to the moments of the occurrence of the azimuths $\theta a$ and $\theta e$ respectively. The offset calculating section 15 estimates or calculates a first amount Aofs of offset in the output signal of the angular-velocity sensor 11 by referring to the following equation.

$$Aofs = \phi ea / Tea$$

The offset calculating section 15 evaluates the calculated first offset amount Aofs. Specifically, the offset calculating section 15 compares the time Tea with a predetermined reference time corresponding to a preset shortest interval. In addition, the offset calculating section 15 calculates the difference $\theta ea$ between the azimuth $\theta a$ and the azimuth $\theta e$. Here, the azimuth difference $\theta ea$ is given as $\theta ea = \theta e - \theta a$. The offset calculating section 15 compares the azimuth difference $\theta ea$ with a predetermined reference azimuth difference corresponding to a preset maximum azimuth difference. In the case where the time Tea is equal to or longer than the predetermined reference time and the azimuth difference $\theta ea$ is equal to or smaller than the predetermined reference azimuth difference, the offset calculating section 15 updates or newly calculates a second amount Bofs of offset in the output signal of the angular-velocity sensor 11 by referring to the following equation.

$$Bofs = Aofs$$

On the other hand, when the time Tea is shorter than the predetermined reference time or when the azimuth difference $\theta ea$ is greater than the predetermined reference azimuth difference, the offset calculating section 15 discards the calculated first offset amount Aofs and holds a second offset amount Bofs unchanged. A signal indicating the second offset amount Bofs constitutes the offset-representing signal.

Figure 5:
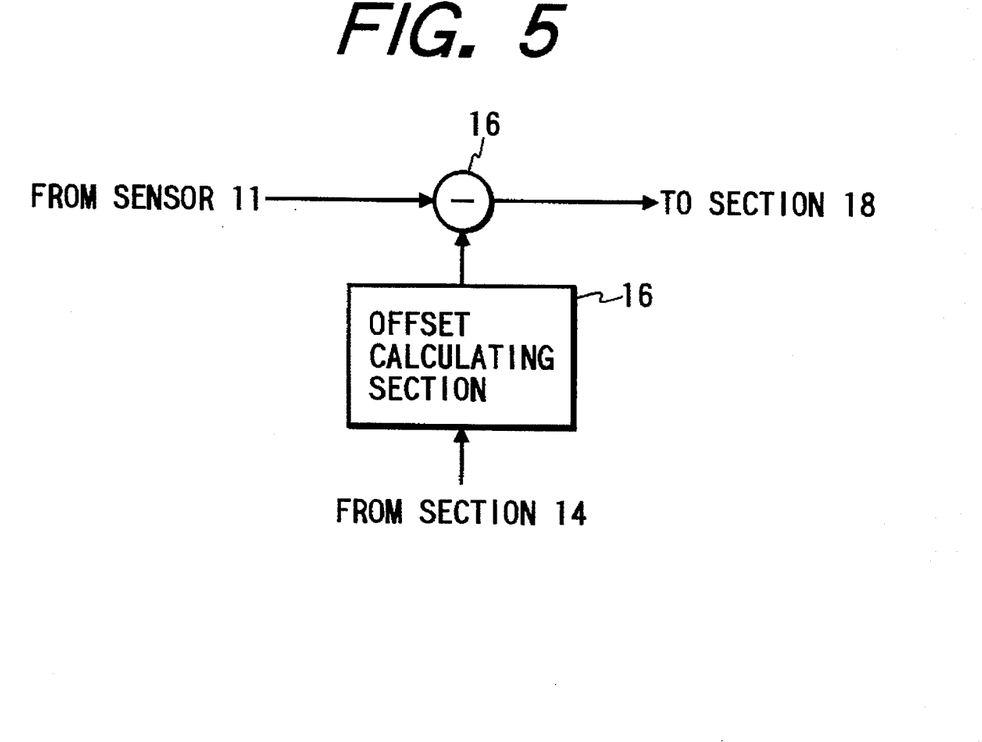
FIG. 5 is a flow diagram of a portion of the function of the vehicle rotational-angle calculating apparatus in FIG. 3.

FIG. 5 shows the offset calculating section 15 and the offset correcting section 16. It should be noted that FIG. 5 is a function flow diagram which does not directly show the hardware. With reference to FIG. 5, the offset calculating section 15 estimates or calculates an amount of offset in the output signal of the angular-velocity sensor 11 from the first-type and second-type rotation data pieces collected by the rotation data collecting section 14. The offset calculating section 15 generates a signal representing the calculated amount of offset in the output signal of the angular-velocity sensor 11. The generated signal representing the calculated amount of offset is referred to as the offset-representing signal. The offset correcting section 16 includes a subtracting section which receives a digitized version of the output signal of the angular-velocity sensor 11. The subtracting section 16 is informed of the offset-representing signal generated by the offset calculating section 15. The subtracting section 16 subtracts the offset-representing signal from the digitized version of the output signal of the angular-velocity sensor 11, thereby removing offset components from the digitized version of the output signal of the angular-velocity sensor 11 and correcting the digitized version of the output signal of the angular-velocity sensor 11 into an offset-free angular-velocity signal. The offset-free angular-velocity signal generated by the subtracting section 16 is fed to the sensitivity coefficient correcting section 18.

Figure 6:
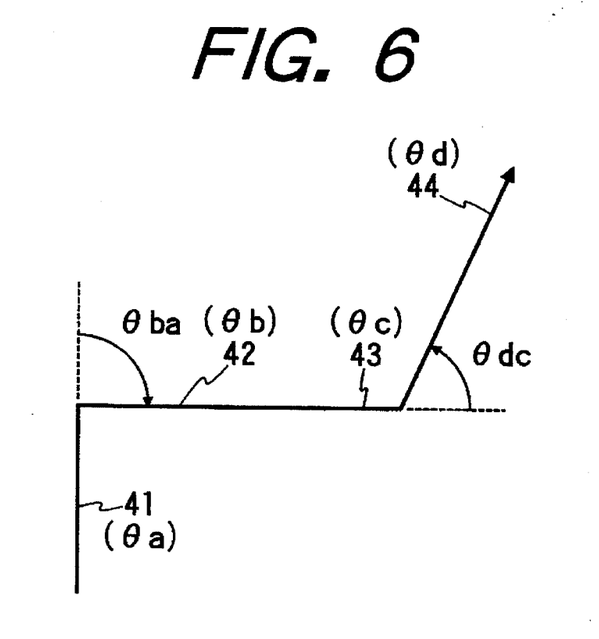
FIG. 6 is a diagram of another example of a time-domain change in the azimuth of a vehicle body.

The sensitivity coefficient calculating section 17 will be further described. It is now assumed that, as shown in FIG. 6, the vehicle body sequentially assumes azimuths (pointing directions) 41, 42, 43, and 44. The azimuths 41, 42, 43, and 44 are also denoted by $\theta a$, $\theta b$, $\theta c$, and $\theta d$ respectively. The sensitivity coefficient calculating section 17 refers to the azimuths $\theta a$, $\theta b$, $\theta c$, and $\theta d$ which are represented by the second-type rotation data pieces collected by the rotation data collecting section 14. The offset calculating section 17 also uses the first-type rotation data pieces collected by the rotation data collecting section 14. The first-type rotation data pieces represent the tentative rotational-angle values $\phi a$, $\phi b$, $\phi c$, and $\phi d$ which correspond in occurrence moments to the azimuths $\theta a$, $\theta b$, $\theta c$, and $\theta d$ respectively.

The sensitivity coefficient calculating section 17 calculates the difference $\theta ba$ between the azimuth $\theta a$ and the azimuth $\theta b$. Here, the azimuth difference $\theta ba$ is given as $\theta ba=\theta b-\theta a$. The sensitivity coefficient calculating section 17 calculates the difference $\theta dc$ between the azimuth $\theta c$ and the azimuth $\theta d$. Here, the azimuth difference $\theta dc$ is given as $\theta dc=\theta d-\theta c$. The sensitivity coefficient calculating section 17 calculates a synthetic azimuth difference $\theta sns$ by referring to the following equation.

$$\theta sns=\theta dc-\theta ba$$

The sensitivity coefficient calculating section 17 calculates the difference $\phi ba$ between the tentative rotational-angle value $\phi a$ and the tentative rotational-angle value $\phi b$ which relate to occurrence moments substantially equal to the moments of the occurrence of the azimuths $\theta a$ and $\theta b$ respectively. The sensitivity coefficient calculating section 17 calculates the difference $\phi dc$ between the tentative rotational-angle value $\phi c$ and the tentative rotational-angle value $\phi d$ which relate to occurrence moments substantially equal to the moments of the occurrence of the azimuths $\theta c$ and $\theta d$ respectively. The sensitivity coefficient calculating section 17 calculates a synthetic angular difference $\phi sns$ by referring to the following equation.

$$\phi sns=\phi dc-\phi ba$$

The sensitivity coefficient calculating section 17 estimates or calculates a first sensitivity coefficient (a first gain factor) Gf, related to the output signal of the angular-velocity sensor 11, by referring to the following equation.

$$Gf=\phi sns/\theta sns$$

The calculated first sensitivity coefficient Gf indicates a relative sensitivity error. When the relative sensitivity error is equal to, for example, +3% (+0.03), the first sensitivity coefficient Gf is expressed as 1.03. The sensitivity coefficient calculating section 17 evaluates the calculated first sensitivity coefficient Gf. Specifically, the sensitivity coefficient calculating section 17 compares the calculated synthetic azimuth difference $\theta sns$ with a predetermined reference azimuth difference corresponding to a preset minimum azimuth difference. In the case where the synthetic azimuth difference $\theta sns$ is equal to or greater than than the predetermined reference azimuth difference, the sensitivity coefficient calculating section 17 updates or newly calculates a second sensitivity coefficient (a second gain factor) Hf, related to the output signal of the angular-velocity sensor 11, by referring to the following equation.

$$Hf=Gf$$

On the other hand, when the synthetic azimuth difference $\theta sns$ is smaller than the predetermined reference azimuth difference, the sensitivity coefficient calculating section 17 discards the calculated first sensitivity coefficient Gf and holds a second sensitivity coefficient Hf unchanged. A signal indicating the second sensitivity coefficient Hf constitutes the sensitivity coefficient signal.

The vehicle rotational-angle calculating apparatus of this embodiment may be modified as follows. A modified vehicle rotational-angle calculating apparatus additionally includes a judging section for deciding whether or not the offset amount calculated by the offset calculating section 15 is in a predetermined range, and an adjusting section for controlling the correction by the offset correcting section 16 in response to the result of the decision by the judging section.

The vehicle rotational-angle calculating apparatus of this embodiment has the following advantages. In a wide range of conditions of the vehicle body, the offset-representing signal generated by the offset calculating section 15 is periodically updated. For example, even in the case where the vehicle body remains turning or meandering for a long time, the offset-representing signal can be periodically updated. Therefore, the offset-representing signal adequately follows a drift in the offset components of the output signal of the angular-velocity sensor 11. This fact causes a high accuracy of the offset-free angular-velocity signal generated by the offset correcting section 16, and also a high accuracy of the rotational-angle signal generated by the final rotational-angle calculating section 19. The sensitivity conditions related to the offset-free angular-velocity signal or the output signal of the angular-velocity sensor 11 are corrected time to time by the sensitivity coefficient correcting section 18. This correction enables a high accuracy of the rotational-angle signal generated by the final rotational-angle calculating section 19.

Second Embodiment

A second embodiment of this invention is similar to the first embodiment except that the offset calculating section 15 (see FIG. 3) is modified as follows.

The offset calculating section 15 in the second embodiment will now be described. It is now assumed that, as shown in FIG. 4, the vehicle body sequentially assumes azimuths (pointing directions) 21, 22, 23, and 24. The azimuths 21, 22, 23, and 24 are also denoted by $\theta a$, $\theta b$, $\theta c$, and $\theta d$ respectively. The offset calculating section 15 refers to the azimuths $\theta a$, $\theta b$, $\theta c$, and $\theta d$ which are represented by the second-type rotation data pieces collected by the rotation data collecting section 14. The offset calculating section 15 also uses the first-type rotation data pieces collected by the rotation data collecting section 14. The first-type rotation data pieces represent the tentative rotational-angle values φa, φb, φc, and φd which correspond in occurrence moments to the azimuths θa, θb, θc, and θd respectively.

The offset calculating section 15 calculates the time Tba between the moment of the occurrence of the azimuth θa and the moment of the occurrence of the azimuth θb. The offset calculating section 15 calculates the time Tdc between the moment of the occurrence of the azimuth θc and the moment of the occurrence of the azimuth θd. The offset calculating section 15 calculates the difference φba between the tentative rotational-angle value φa and the tentative rotational-angle value φb which relate to occurrence moments substantially equal to the moments of the occurrence of the azimuths θa and θb respectively. The offset calculating section 15 calculates the difference φdc between the tentative rotational-angle value φc and the tentative rotational-angle value φd which relate to occurrence moments substantially equal to the moments of the occurrence of the azimuths θc and θd respectively. The offset calculating section 15 estimates or calculates a first amount Aofs of offset in the output signal of the angular-velocity sensor 11 by referring to the following equation.

$$Aofs = (\phi ba + \phi dc)/(Tba + Tdc)$$

The offset calculating section 15 evaluates the calculated first offset amount Aofs. Specifically, the offset calculating section 15 compares the time Tba+Tdc with a predetermined reference time corresponding to a preset shortest interval. In addition, the offset calculating section 15 calculates the difference θba between the azimuth θa and the azimuth θb. Here, the azimuth difference θba is given as θba=θb−θa. The offset calculating section 15 calculates the difference θdc between the azimuth θc and the azimuth θd. Here, the azimuth difference θdc is given as θdc=θd−θc. The offset calculating section 15 calculates a total azimuth difference θofs by referring to the following equation.

$$\theta ofs = \theta ba + \theta dc$$

The offset calculating section 15 compares the calculated total azimuth difference θofs with a predetermined reference azimuth difference corresponding to a preset maximum azimuth difference. In the case where the time Tba+Tdc is equal to or longer than the predetermined reference time and the total azimuth difference θofs is equal to or smaller than the predetermined reference azimuth difference, the offset calculating section 15 updates or newly calculates a second amount Bofs of offset in the output signal of the angular-velocity sensor 11 by referring to the following equation.

$$Bofs = Aofs$$

On the other hand, when the time Tba+Tdc is shorter than the predetermined reference time or when the total azimuth difference θofs is greater than the predetermined reference azimuth difference, the offset calculating section 15 discards the calculated first offset amount Aofs and holds a second offset amount Bofs unchanged. A signal indicating the second offset amount Bofs constitutes the offset-representing signal.

Third Embodiment

Figure 7:
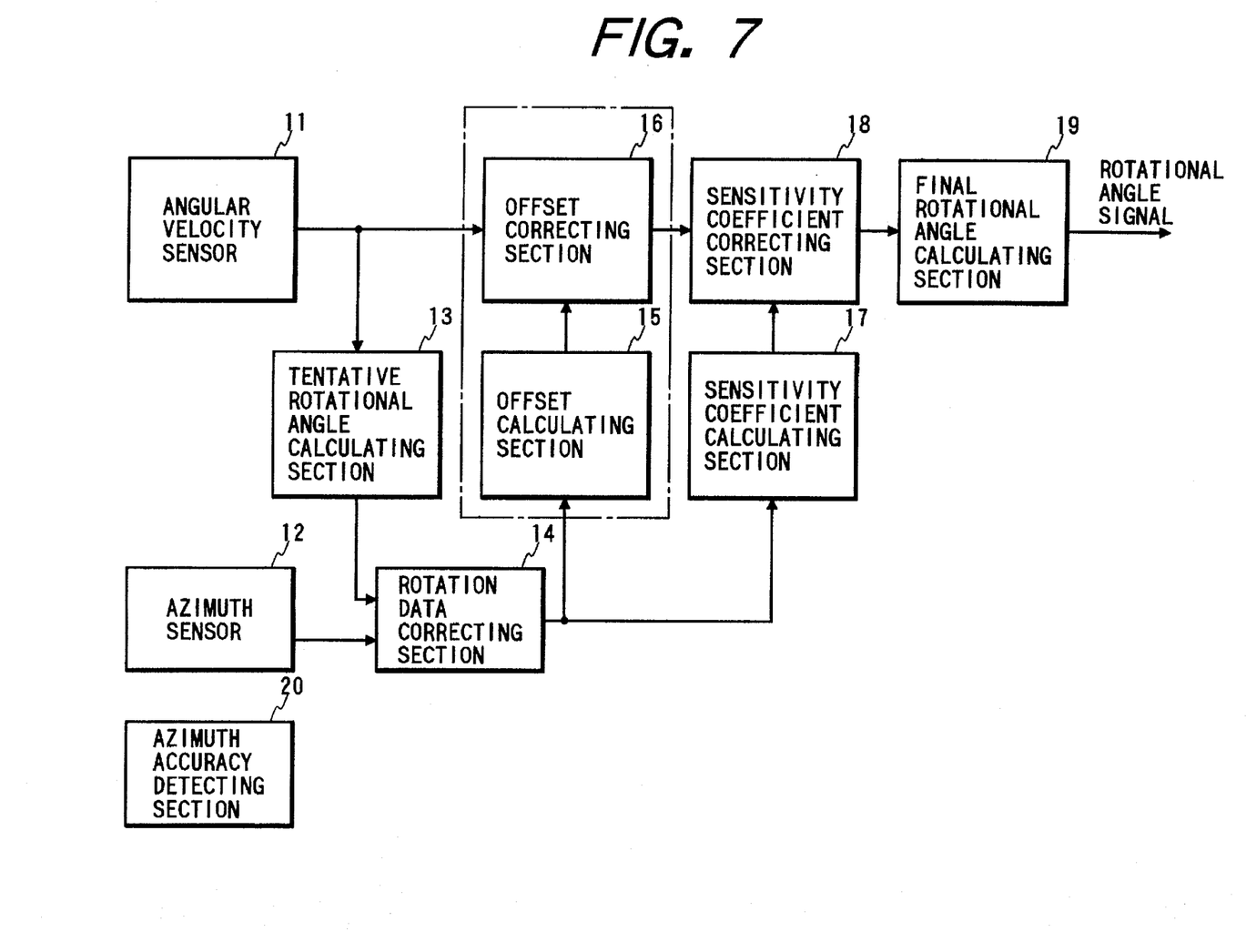
FIG. 7 is a flow diagram of the function of a vehicle rotational-angle calculating apparatus according to a third embodiment of this invention.

FIG. 7 shows a third embodiment of this invention which is similar to the first embodiment except for design changes indicated hereinafter. The embodiment of FIG. 7 includes an azimuth accuracy detecting section 20.

The azimuth accuracy detecting section 20 generates information of accuracies of azimuth data pieces collected by a rotation-data collecting section 14. The azimuth accuracy detecting section 20 informs the rotation-data collecting section 14 and an offset calculating section 15 of the accuracies of the azimuth data pieces. The offset calculating section 15 determines the accuracies of azimuth differences in response to the accuracies of the azimuth data pieces. Higher priority is given to azimuth differences having higher accuracies while lower priority is given to azimuth differences having lower accuracies. Generally, the azimuth differences with higher priority are used in the calculation of an offset amount while the azimuth differences with lower priority are disregarded.

Fourth Embodiment

Figure 8:
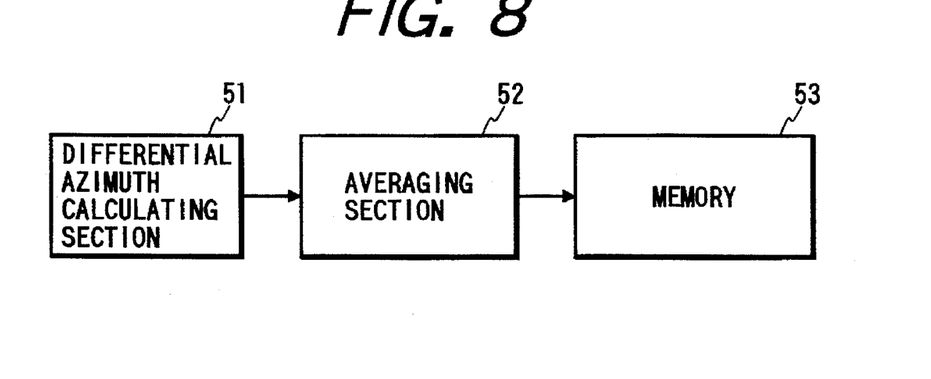
FIG. 8 is a flow diagram of the function of a portion of a vehicle rotational-angle calculating apparatus according to a fourth embodiment of this invention.
Figure 9:
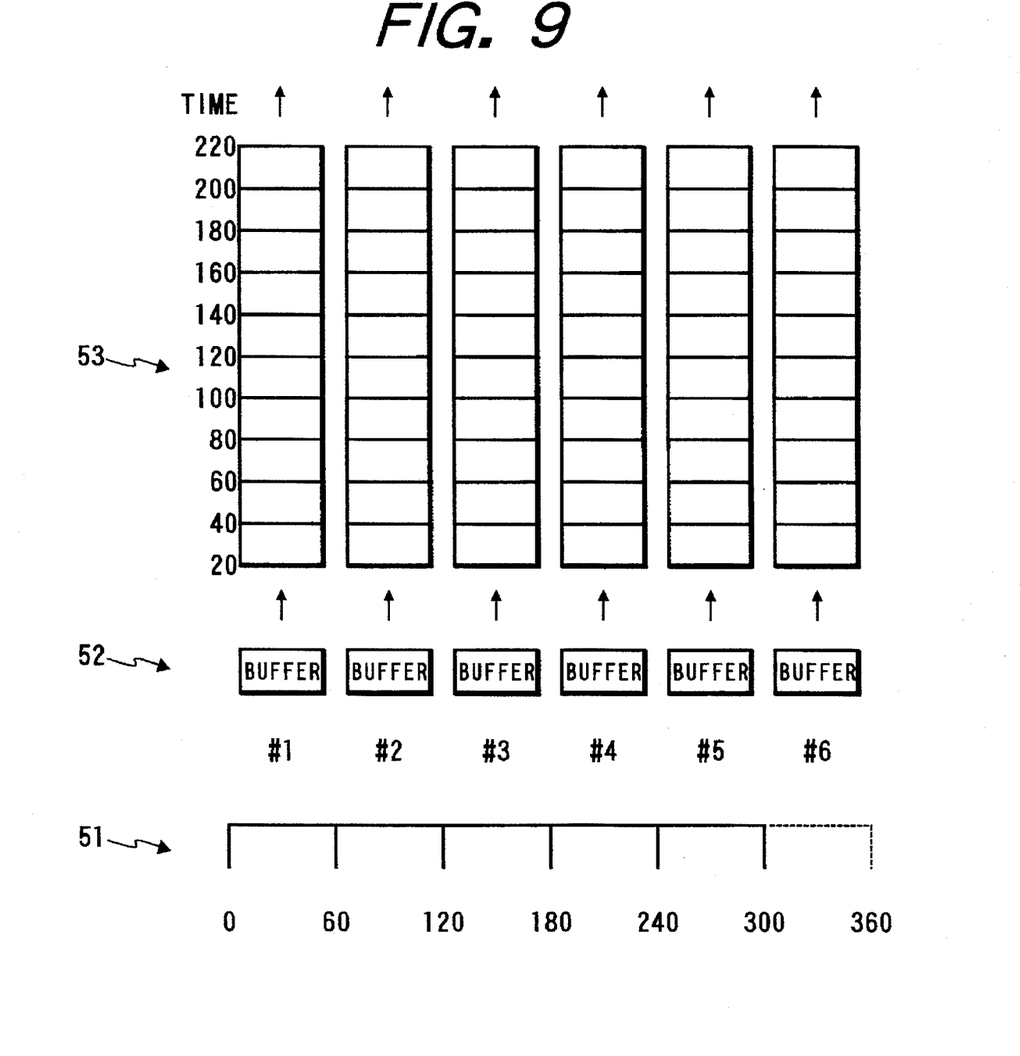
FIG. 9 is a diagram of a portion of the vehicle rotational-angle calculating apparatus according to the fourth embodiment.

A fourth embodiment of this invention is similar to the first embodiment except for design changes indicated hereinafter. With reference to FIGS. 8 and 9, a differential azimuth calculating section 51 calculates a differential azimuth DAn for every given period (equal to, for example, 1 second) by referring to the following equation.

$$DAn = \phi n - \theta n$$

where φn denotes the latest tentative rotational-angle value calculated by a tentative rotational-angle calculating section 13, and θn denotes the latest azimuth angle represented by the output signal of an azimuth sensor 12. The differential azimuth calculating section 51 sets six groups corresponding to azimuth angle ranges of 0°–60°, 60°–120°, 120°–180°, 180°–240°, 240°–300°, and 300°–360° respectively. The differential azimuth calculating section 51 selects one of the six groups in accordance with the latest azimuth angle θn, and places a data piece of the calculated differential azimuth DAn into the selected group. In this way, the latest and previous differential azimuths DAn, DAn-1, DAn-2, ... are separated into the six groups.

The six groups are provided in buffers #1, #2, #3, #4, #5, and #6 respectively. Differential azimuths represented by data pieces in each of the six groups are averaged by an averaging section 52 into a mean differential azimuth for every given interval (for example, 20 seconds). By the averaging section 52, data pieces of the mean differential azimuths related to the six groups are transferred from the buffers #1, #2, #3, #4, #5, and #6 to corresponding buffers in a memory 53 respectively. The averaging section 52 compares the number of effective data pieces in each of the six groups with a given number (equal to, for example, 7). With regard to a group in which the number of effective data pieces is equal to or greater than the given number, the data piece of the mean differential azimuth is transferred to the corresponding buffer in the memory 53 as an effective data piece. With regard to a group in which the number of effective data pieces is smaller than the given number, the data piece of the mean differential azimuth is transferred to the corresponding buffer in the memory 53 as an invalid data piece.

Each of the buffers in the memory 53 includes a shift registers having a given number of stages. Each time the new data pieces of the mean differential azimuths are written into the first stages of the buffers, the oldest data pieces are removed from the last stages of the buffers. The mean differential azimuths represented by the data pieces in each of the buffers relate to previous or retroactive intervals of, for example, 20–40 seconds, 40–60 seconds, 60–80 seconds, . . . respectively.

An offset calculating section 15 (see FIG. 3) accesses the buffers #1, #2, #3, #4, #5, and #6, and the buffers in the memory 53. The offset calculating section 15 checks whether the data pieces of the latest mean differential azimuths related to the respective groups are effective or invalid. With regard to each of the effective data pieces of the latest mean differential azimuths, the offset calculating section 15 searches the corresponding buffer in the memory 53 for an effective data piece of a previous mean differential azimuth. When such an effective data piece of a previous mean differential azimuth is found, the offset calculating section 15 calculates the difference Δt between the occurrence interval related to the latest effective data piece and the occurrence interval related to the previous effective data piece. The offset calculating section 15 compares the calculated temporal difference Δt with a predetermined reference time (for example, 180 seconds). In the case where the temporal difference Δt is equal to or greater than the predetermined reference time, the offset calculating section 15 calculates an amount Cofs of offset in the output signal of an angular-velocity sensor 11 (see FIG. 3) by referring to the following equation.

$$Cofs = (\theta new - \theta old)/\Delta t$$

where θnew denotes the mean differential azimuth represented by the latest effective data piece, and θold denotes the mean differential azimuth represented by the previous effective data piece.

What is claimed is:

1. A vehicle rotational-angle calculating apparatus comprising:

a first sensor outputting a signal representing an angular rate of a vehicle body;

a second sensor outputting a signal representing a direction of the vehicle body;

first means connected to the first sensor for integrating the output signal of the first sensor to generate a signal representing a tentative rotational angle of the vehicle body;

second means connected to the second sensor for generating first data pieces representing temporally spaced samples of the output signal of the second sensor respectively;

third means connected to the first means for generating second data pieces representing temporally spaced samples of the signal generated by the first means respectively;

fourth means connected to the second means for selecting two first data pieces from among the first data pieces generated by the second means, the selected two first data pieces relating to occurrence moments spaced by at least a given time;

fifth means connected to the fourth means for calculating a time interval between the occurrence moments of the selected two first data pieces;

sixth means connected to the third means for selecting two second data pieces from among the second data pieces generated by the third means, the selected two second data pieces relating to occurrence moments corresponding to the occurrence moments of the selected first data pieces respectively;

seventh means connected to the fourth means for calculating a direction difference between directions represented by the selected two first data pieces:

eighth means connected to the seventh means for deciding whether or not the direction difference calculated by the seventh means is greater than a predetermined direction difference;

ninth means connected to the sixth means for calculating a rotational-angle difference between tentative rotational angles represented by the selected two second data pieces:

tenth means connected to the fifth means, the eighth means, and the ninth means for calculating an amount of offset in the output signal of the first sensor in response to the time interval calculated by the fifth means and the rotational-angle difference calculated by the ninth means in cases where the eighth means decides that the direction difference calculated by the seventh means is equal to or smaller than the predetermined direction difference;

eleventh means connected to the first sensor and the tenth means for correcting the output signal of the first sensor into an offset-free signal in response to the offset amount calculated by the tenth means: and twelfth means connected to the eleventh means for integrating the offset-free signal to generate a signal representing a final rotational angle of the vehicle body.

2. A vehicle rotational-angle calculating apparatus comprising:

a first sensor outputting a signal representing an angular rate of a vehicle body;

a second sensor outputting a signal representing a direction of the vehicle body;

first means connected to the first sensor for integrating the output signal of the first sensor to generate a signal representing a tentative rotational angle of the vehicle body;

second means connected to the second sensor for generating first data pieces representing temporally spaced samples of the output signal of the second sensor respectively;

third means connected to the first means for generating second data pieces representing temporally spaced samples of the signal generated by the first means respectively;

fourth means connected to the second means for selecting a first pair of first data pieces and a second pair of first data pieces from among the first data pieces generated by the second means;

fifth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively;

sixth means connected to the fourth means for calculating a first direction difference between directions represented by the two first data pieces in the first pair, and a second direction difference between directions represented by the two first data pieces in the second pair;

seventh means connected to the fifth means for calculating a first rotational-angle difference between tentative rotational angles represented by the two second data pieces in the first pair, and a second rotational-angle difference between tentative rotational angles represented by the two second data pieces in the second pair;

eighth means connected to the sixth means for calculating a difference between the first direction difference and the second direction difference calculated by the sixth means;

ninth means connected to the seventh means for calculating a difference between the first rotational-angle difference and the second rotational-angle difference calculated by the seventh means;

tenth means connected to the eighth means and the ninth means for calculating a sensitivity coefficient related to the output signal of the first sensor in response to the difference calculated by the eighth means and the difference calculated by the ninth means;

eleventh means connected to the first sensor and the tenth means for correcting a magnitude of the output signal of the first sensor in response to the sensitivity coefficient calculated by the tenth means to convert the output signal of the first sensor into a gain-corrected signal; and twelfth means connected to the eleventh means for integrating the gain-corrected signal to generate a signal representing a final rotational angle of the vehicle body.

3. A vehicle rotational-angle calculating apparatus comprising:

a first sensor outputting a signal representing an angular rate of a vehicle body;

a second sensor outputting a signal representing a direction of the vehicle body;

first means connected to the first sensor for integrating the output signal of the first sensor to generate a signal representing a tentative rotational angle of the vehicle body;

second means connected to the second sensor for generating first data pieces representing temporally spaced samples of the output signal of the second sensor respectively;

third means connected to the first means for generating second data pieces representing temporally spaced samples of the signal generated by the first means respectively;

fourth means connected to the second means for selecting a first pair of first data pieces and a second pair of first data pieces from among the first data pieces generated by the second means;

fifth means connected to the fourth means for calculating a first time interval between the occurrence moments of the two first data pieces in the first pair, and a second time interval between the occurrence moments of the two first data pieces in the second pair;

sixth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively;

seventh means connected to the fourth means for calculating a first direction difference between directions represented by the two first data pieces in the first pair, and a second direction difference between directions represented by the two first data pieces in the second pair;

eighth means connected to the fifth means for calculating a sum of the first time interval and the second time interval calculated by the fifth means;

ninth means connected to the seventh means for calculating a sum of the first direction difference and the second direction difference calculated by the seventh means;

tenth means connected to the eighth means for deciding whether or not the sum calculated by the eighth means is smaller than a predetermined time interval;

eleventh means connected to the ninth means for deciding whether or not the sum calculated by the ninth means is greater than a predetermined direction difference;

twelfth means connected to the sixth means for calculating a first rotational-angle difference between tentative rotational angles represented by the two second data pieces in the first pair, and a second rotational-angle difference between tentative rotational angles represented by the two second data pieces in the second pair;

thirteenth means connected to the twelfth means for calculating a sum of the first rotation-angle difference and the second rotational-angle difference calculated by the twelfth means;

fourteenth means connected to the eighth means, the tenth means, the eleventh means, and the thirteenth means for calculating an amount of offset in the output signal of the first sensor in response to the sum calculated by the eighth means and the sum calculated by the thirteenth means in cases where the tenth means decides that the sum calculated by the eighth means is equal to or greater than the predetermined time interval and the eleventh means decides that the sum calculated by the ninth means is equal to or smaller than a predetermined direction difference;

fifteenth means connected to the first sensor and the fourteenth means for correcting the output signal of the first sensor into an offset-free signal in response to the offset amount calculated by the fourteenth means;

sixteenth means connected to the seventh means for calculating a difference between the first direction difference and the second direction difference calculated by the seventh means;

seventeenth means connected to the twelfth means for calculating a difference between the first rotational-angle difference and the second rotational-angle difference calculated by the twelfth means;

eighteenth means connected to the sixteenth means and the seventeenth means for calculating a sensitivity coefficient related to the output signal of the first sensor in response to the difference calculated by the sixteenth means and the difference calculated by the seventeenth means;

nineteenth means connected to the first sensor and the eighteenth means for correcting a magnitude of the output signal of the first sensor in response to the sensitivity coefficient calculated by the eighteenth means to convert the output signal of the first sensor into a gain-corrected signal; and twentieth means connected to the nineteenth means for integrating the gain-corrected signal to generate a signal representing a final rotational angle of the vehicle body.

4. A vehicle rotational-angle calculating apparatus comprising:

a first sensor outputting a signal representing an angular rate of a vehicle body;

a second sensor outputting a signal representing a direction of the vehicle body;

first means connected to the first sensor for integrating the output signal of the first sensor to generate a signal representing a tentative rotational angle of the vehicle body;

second means connected to the second sensor for generating first data pieces representing temporally spaced samples of the output signal of the second sensor respectively;

third means connected to the first means for generating second data pieces representing temporally spaced samples of the signal generated by the first means respectively;

fourth means connected to the second means for selecting a first pair of first data pieces and a second pair of first data pieces from among the first data pieces generated by the second means;

fifth means connected to the fourth means for calculating a first time interval between the occurrence moments of the two first data pieces in the first pair, and a second time interval between the occurrence moments of the two first data pieces in the second pair;

sixth means connected to the third means for selecting a first pair of second data pieces and a second pair of second data pieces from among the second data pieces generated by the third means, wherein the two second data pieces in the first pair relate to occurrence moments corresponding to the occurrence moments of the first data pieces in the first pair respectively, and the two second data pieces in the second pair relate to occurrence moments corresponding to the occurrence moments of the first data pieces in the second pair respectively;

seventh means connected to the fourth means for calculating a first direction difference between directions represented by the two first data pieces in the first pair, and a second direction difference between directions represented by the two first data pieces in the second pair;

eighth means connected to the fifth means for calculating a sum of the first time interval and the second time interval calculated by the fifth means;

ninth means connected to the seventh means for calculating a sum of the first direction difference and the second direction difference calculated by the seventh means;

tenth means connected to the eighth means for deciding whether or not the sum calculated by the eighth means is smaller than a predetermined time interval;

eleventh means connected to the ninth means for deciding whether or not the sum calculated by the ninth means is greater than a predetermined direction difference;

twelfth means connected to the sixth means for calculating a first rotational-angle difference between tentative rotational angles represented by the two second data pieces in the first pair, and a second rotational-angle difference between tentative rotational angles represented by the two second data pieces in the second pair;

thirteenth means connected to the twelfth means for calculating a sum of the first rotation-angle difference and the second rotational-angle difference calculated by the twelfth means;

fourteenth means connected to the eighth means, the tenth means, the eleventh means, and the thirteenth means for calculating an amount of offset in the output signal of the first sensor in response to the sum calculated by the eighth means and the sum calculated by the thirteenth means in cases where the tenth means decides that the sum calculated by the eighth means is equal to or greater than the predetermined time interval and the eleventh means decides that the sum calculated by the ninth means is equal to or smaller than a predetermined direction difference;

fifteenth means connected to the first sensor and the fourteenth means for correcting the output signal of the first sensor into an offset-free signal in response to the offset amount calculated by the fourteenth means; and sixteenth means connected to the fifteenth means for integrating the offset-free signal to generate a signal representing a final rotational angle of the vehicle body.

5. The vehicle rotational-angle calculating apparatus of claim 1, further comprising thirteenth means connected to the second means and the third means for storing each of the first data pieces and the second data pieces during a predetermined length of time.

6. The vehicle rotational-angle calculating apparatus of claim 1, further comprising thirteenth means connected to the second sensor for detecting an accuracy of the output signal of the second sensor, and fourteenth means connected to the tenth means and the thirteen means for controlling the offset amount calculated by the tenth means in response to the accuracy detected by the thirteenth means.

7. The vehicle rotational-angle calculating apparatus of claim 1, further comprising thirteenth means connected to the tenth means for deciding whether or not the offset amount calculated by the tenth means is in a predetermined range, and fourteenth means connected to the eleventh means and the thirteenth means for controlling the correction by the eleventh means in response to whether or not the offset amount calculated by the tenth means is in the predetermined range.

8. The vehicle rotational-angle calculating apparatus of claim 1, further comprising thirteenth means connected to the second sensor and the first means for periodically calculating a direction difference between the vehicle body direction represented by the output signal of the second sensor and the tentative rotational angle represented by the signal generated by the first means, fourteenth means connected to the thirteenth means for averaging latest and previous direction differences calculated by the thirteenth means into a mean direction difference during every given interval, fifteenth means connected to the fourteenth means for separating latest and previous mean direction differences calculated by the fourteenth means into groups according to related vehicle body directions, and sixteenth means connected to the fifteenth means and contained in the tenth means for determining the offset amount in response to mean direction differences in same one of the groups.

* * * * *